(12) United States Patent
Lee et al.

(10) Patent No.: US 9,710,885 B2
(45) Date of Patent: Jul. 18, 2017

(54) IMAGE PROCESSING APPARATUS, IMAGE PROCESSING METHOD, AND IMAGE PROCESSING SYSTEM FOR PERFORMING SUB-PIXEL INTERPOLATION

(71) Applicant: SAMSUNG ELECTRONICS CO., LTD., Suwon-si (KR)

(72) Inventors: Jee-hong Lee, Seoul (KR); Nyeong-kyu Kwon, Daejeon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/955,676

(22) Filed: Dec. 1, 2015

(65) Prior Publication Data

US 2016/0171651 A1    Jun. 16, 2016

(30) Foreign Application Priority Data

Dec. 11, 2014    (KR) .................... 10-2014-0178715

(51) Int. Cl.
  *G06K 9/32*    (2006.01)
  *G06T 3/40*    (2006.01)
  *H04N 9/04*    (2006.01)

(52) U.S. Cl.
  CPC .......... *G06T 3/4015* (2013.01); *G06T 3/4007* (2013.01); *G06T 2207/10148* (2013.01); *H04N 9/045* (2013.01); *H04N 2209/046* (2013.01)

(58) Field of Classification Search
  CPC ............... G06T 3/4015; G06T 3/4007; G06T 2207/10148; H04N 2209/046; H04N 9/045

USPC ......................................................... 382/300
See application file for complete search history.

(56) References Cited

U.S. PATENT DOCUMENTS

| | | | |
|---|---|---|---|
| 7,292,725 B2 | 11/2007 | Chen et al. | |
| 7,643,676 B2 | 1/2010 | Malvar | |
| 7,876,957 B2* | 1/2011 | Ovsiannikov | H04N 9/045 382/162 |
| 8,243,158 B2 | 8/2012 | Utsugi | |
| 8,452,092 B2* | 5/2013 | Sasaki | G06T 3/4015 382/162 |
| 8,467,088 B2* | 6/2013 | Hosaka | H04N 1/58 358/1.9 |

(Continued)

FOREIGN PATENT DOCUMENTS

JP         2014-027526 A    2/2014

*Primary Examiner* — Kanjibhai Patel
(74) *Attorney, Agent, or Firm* — Sughrue Mion, PLLC

(57) ABSTRACT

An image processing apparatus includes a region determiner configured to receive image data and perform a region determination by determining whether each of a plurality of sub-pixels included in the image data is included in an in-focusing region that is focused or an out-focusing region that is not focused; and an interpolator configured to perform demosaicing with respect to a sub-pixel included in the in-focusing region by using a first algorithm and perform the demosaicing with respect to a sub-pixel included in the out-focusing region by using a second algorithm, according to a result of the region determination, wherein, when the demosaicing with respect to the sub-pixel included in the in-focusing region is performed, one or more peripheral sub-pixels having phases that are different from a phase of the sub-pixel, on which the demosaicing is performed, are used.

19 Claims, 13 Drawing Sheets

(56) References Cited

U.S. PATENT DOCUMENTS

| | | |
|---|---|---|
| 8,531,545 B2 | 9/2013 | Kosaka |
| 8,593,483 B2 | 11/2013 | Cote et al. |
| 8,698,885 B2 | 4/2014 | DiCarlo et al. |
| 8,704,922 B2 | 4/2014 | Tanaka |
| 8,749,646 B2 * | 6/2014 | Mitsunaga ......... H04N 5/23248 348/208.6 |
| 8,749,694 B2 | 6/2014 | Georgiev et al. |
| 8,804,015 B2 | 8/2014 | Hayashi et al. |
| 9,344,690 B2 * | 5/2016 | Nowozin ............... G06T 3/4015 |
| 2012/0206582 A1 | 8/2012 | DiCarlo et al. |
| 2013/0063571 A1 | 3/2013 | Ishii |

\* cited by examiner

IMAGE PROCESSING APPARATUS, IMAGE PROCESSING METHOD, AND IMAGE PROCESSING SYSTEM FOR PERFORMING SUB-PIXEL INTERPOLATION

CROSS-REFERENCE TO RELATED APPLICATION

This application claims priority from Korean Patent Application No. 10-2014-0178715, filed on Dec. 11, 2014, in the Korean Intellectual Property Office, the disclosure of which is incorporated herein in its entirety by reference.

BACKGROUND

1. Field

Apparatuses and methods consistent with exemplary embodiments relate to an image processing apparatus, an image processing method, and an image processing system, and more particularly, to an image processing apparatus, an image processing method, and an image processing system for performing sub-pixel interpolation.

2. Description of the Related Art

A complementary metal oxide semiconductor (CMOS) image sensor (CIS) used as a solid state image pickup device converts optical image signals received from outside to electric image signals. The CIS has been used in various fields because the CIS may operate with a lower voltage than that of a charge-coupled device (CCD), has a low power consumption, and is advantageous for high integration. The CIS may include a pixel array including a plurality of pixels, and the pixel array may include a plurality of sub-pixel groups. A plurality of sub-pixels included in one sub-pixel group may have different phases from one another, and accordingly, it may be understood that the pixel array includes phase-difference pixels.

An image sensor to which the sub-pixels are applied may quickly perform an auto-focusing operation by using the sub-pixel groups having phase differences, but a resolution may be degraded in a demosaicing process for performing interpolation with respect to each sub-pixel.

SUMMARY

One or more exemplary embodiments provide an image processing apparatus, an image processing method, and an image processing system capable of reducing loss in resolution and improving image quality characteristics with respect to image data obtained from an image sensor, to which sub-pixels are applied.

According to an aspect of an exemplary embodiment, there is provided an image processing apparatus including: a region determiner configured to receive image data and perform a region determination by determining whether each of a plurality of sub-pixels included in the image data is included in an in-focusing region that is focused or an out-focusing region that is not focused; and an interpolator configured to perform demosaicing with respect to a sub-pixel included in the in-focusing region by using a first algorithm and perform the demosaicing with respect to a sub-pixel included in the out-focusing region by using a second algorithm, according to a result of the region determination, wherein, when the demosaicing with respect to the sub-pixel included in the in-focusing region is performed, one or more peripheral sub-pixels having phases that are different from a phase of the sub-pixel, on which the demosaicing is performed, are used.

The region determiner may perform the region determination based on at least one from among a depth map extraction, a cross-correlation calculation, and a blur measurement with respect to the image data.

The region determiner may output a flag having a state that varies depending on the result of the region determination.

The interpolator may perform the demosaicing with respect to the sub-pixel by using the first algorithm when the flag corresponding to the sub-pixel has a first state, and perform the demosaicing with respect to the sub-pixel by using the second algorithm when the flag corresponding to the sub-pixel has a second state.

The image data may include a plurality of pixels, each of which includes n (n being an integer equal to or greater than two) sub-pixels having phases different from each other.

The interpolator may perform the demosaicing with respect to a first sub-pixel included in the in-focusing region by using one or more peripheral sub-pixels having phases that are same as a phase of the first sub-pixel and one or more peripheral sub-pixels having phases that are different from the phase of the first sub-pixel.

The image data may include a plurality of pixels, each of which includes n (n being an integer equal to or greater than two) sub-pixels having phases different from each other, and the interpolator may perform the demosaicing with respect to a first sub-pixel included in the out-focusing region by selectively using one or more peripheral sub-pixels having a certain phase.

The region determiner may divide the image data into a plurality of phase group images according to phases of sub-pixels included in the image data, and perform the region determination of each sub-pixel by analyzing similarities between a reference phase group image, from among the plurality of phase group images, and a phase group image in which the each sub-pixel is included.

The image data may include plurality of pixels, each of which includes (n being an integer equal to or greater than two) sub-pixels having phases different from each other, and the region determiner may perform the region determination according to a unit of a pixel.

The image data may include a plurality of pixel groups, each of which includes a plurality of pixels, and the region determiner may perform the region determination according to a unit of a pixel group.

The interpolator may include a first interpolator configured to perform the demosaicing according to the first algorithm and a second interpolator may perform the demosaicing according to the second algorithm, and data of each sub-pixel is selectively provided to the first interpolator or the second interpolator according to the result of region determination.

According to an aspect of an exemplary embodiment, there is provided an image processing system including: an image sensor including a pixel array, in which a plurality of pixels are arranged, and each of the plurality of pixels includes n (n being an integer equal to or greater than two) sub-pixels having phases different from each other; and an image processing apparatus configured to receive image data from the image sensor, perform a first demosaicing with respect to a first sub-pixel, in response to the first sub-pixel being included in an in-focusing region that is focused, by using peripheral sub-pixels having at least two phases different from each other, and perform a second demosaicing with respect to the first sub-pixel, in response to the first sub-pixel being included in an out-focusing region that is not focused, by using one or more peripheral sub-pixels having the same phase.

The image processing apparatus may include: a region determiner configured to perform a region determination by determining a region, among the in-focusing region and the out-focusing region, in which the first sub-pixel is included, based on at least one from among a depth map extraction, a cross-correlation calculation, and a blur measurement with respect to the image data; and an interpolator configured to perform an interpolation by selectively applying the first demosaicing or the second demosaicing with respect to the first sub-pixel, according to a result of the region determination.

The region determiner may generate a flag corresponding to the first sub-pixel according to a result of the region determination.

The interpolator may perform an interpolation with respect to the first sub-pixel by performing the first demosaicing according to a first algorithm when the flag has a first value, and perform an interpolation with respect to the first sub-pixel by performing the second demosaicing according to a second algorithm when the flag has a second value.

According to an aspect of an exemplary embodiment, there is provided a method of processing an image captured by an image sensor, the method including: interpolating a first sub-pixel included in the image by performing a first demosaicing algorithm in response to the first sub-pixel being included in a first region in the image, the first region being focused; and interpolating a second sub-pixel included in the image by performing a second demosaicing algorithm that is different from the first demosaicing algorithm, in response to the second sub-pixel being included in a second region in the image, the second region being not focused.

The first demosaicing algorithm may use at least one peripheral sub-pixel having a phase that is different from a phase of a peripheral sub-pixel used in the second demosaicing algorithm.

The interpolating the first sub-pixel may include interpolating the first sub-pixel by performing the first demosaicing algorithm using at least two peripheral sub-pixels having phases that are different from each other.

The interpolating the second sub-pixel may include interpolating the second sub-pixel by performing the second demosaicing algorithm using one or more peripheral sub-pixels having the same phase The method may further include determining the first sub-pixel as being included in the first region or the second sub-pixel as being included in the second region based on at least one from among a depth map extraction, a cross-correlation calculation, and a blur measurement with respect to the image data.

BRIEF DESCRIPTION OF THE DRAWINGS

The above and/or other aspects will become more apparent by describing certain exemplary embodiments with reference to the accompanying drawings in which.

DETAILED DESCRIPTION

Figure 1:
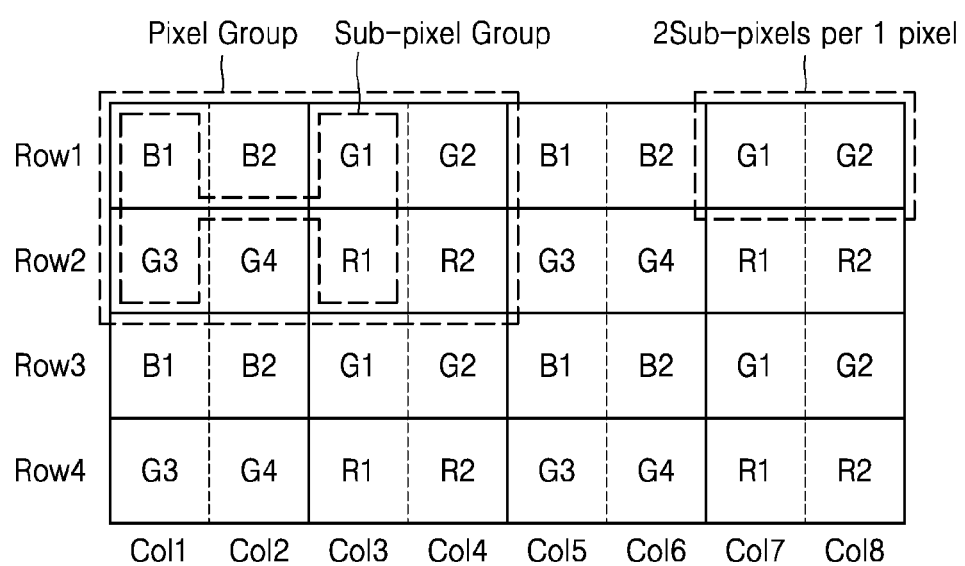
FIG. 1 is a diagram of a pixel array structure applied to an image processing system according to an exemplary embodiment.

Hereinafter, the inventive concept will be described more fully with reference to the accompanying drawings, in which exemplary embodiments are shown. This inventive concept may, however, be embodied in many different forms and should not be construed as limited to the exemplary embodiments set forth herein. Rather, these embodiments are provided so that this disclosure will be thorough and complete, and will fully convey the scope to one of ordinary skill in the art. Sizes of components in the drawings may be exaggerated for convenience of explanation. In other words, since sizes and thicknesses of components in the drawings are arbitrarily illustrated for convenience of explanation, the following embodiments are not limited thereto.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a pixel array structure in an image processing system according to an exemplary embodiment.

The image processing system according to an exemplary embodiment may include an image sensor (for example, a complementary metal oxide semiconductor (CMOS) image sensor) including a pixel array, and the pixel array may include a plurality of pixels arranged in various patterns. For example, the pixel array may include a plurality of pixels arranged on regions where a plurality of rows and a plurality of columns cross each other, and the plurality of pixels may be arranged in a Bayer pattern. As shown in FIG. 1, the plurality of pixels may include red pixels R for sensing red color, green pixels G for sensing green color, and blue pixels B for sensing blue color. Moreover, various patterns may be applied to the pixel array, for example, a cyan, magenta, or yellow (CMY) pixel format may be applied to the pixel array.

In addition, the pixel array applied to the image processing system according to an exemplary embodiment may include pixels having phase differences. As an example, a pixel for sensing color may include two or more sub-pixels, and the sub-pixels included in one pixel may have phases that are different from each other. Referring to FIG. 1, one pixel may include two sub-pixels having different phases from each other, and a photo diode (not shown) corresponding to each of the sub-pixels may be disposed. In FIG. 1, it is described that one pixel includes two sub-pixels, but one pixel may include more than two sub-pixels.

According to the pixel array structure shown in FIG. 1, a row (e.g., a first row Row1) may include blue sub-pixels B1 and B2 for sensing the blue color and green sub-pixels G1 and G2 for sensing the green color, wherein the blue sub-pixels B1 and B2 and the green sub-pixels G1 and G2 are alternately arranged. Also, another row (e.g., a second row Row2) may include green sub-pixels G3 and G4 for sensing the green color and red sub-pixels R1 and R2 for sensing red color, wherein the green sub-pixels G3 and G4 and red sub-pixels R1 and R2 are alternately arranged. In view of columns, the sub-pixels for sensing different colors may be alternately arranged and similarly to the arrangement of the sub-pixels in the rows, for example, the blue sub-pixel B1 for sensing the blue color and the green sub-pixel G3 for sensing the green color may be alternately arranged in a column (e.g., a first column Col1). In addition, in another column (e.g., a third column Col3), the green sub-pixel G1 for sensing the green color and the red sub-pixel R1 for sensing the red color may be alternately arranged.

Also, one pixel group may be defined in the pixel array structure such that, for example, one pixel group may include one blue pixel B, one red pixel R, and two green pixels G. In the example of FIG. 1, since one pixel includes two sub-pixels, one pixel group may include two blue sub-pixels B1 and B2, two red sub-pixels R1 and R2, and four green sub-pixels G1 to G4.

In one pixel group, the sub-pixels may be classified into a sub-pixel group according to phases thereof. Also, in one pixel group, the sub-pixels having the same phases may be defined as one sub-pixel group. Accordingly, one pixel group may include two or more sub-pixel groups having different phases from each other, and in the example of FIG. 1, a first sub-pixel group includes the sub-pixels B1, G1, G3, and R1 and a second sub-pixel group includes the sub-pixels B2, G2, G4, and R2.

An image sensor may provide image data corresponding to one frame, and the image data may have a data value according to the pixel array structure shown in FIG. 1. Here, the image data may be separated into two phase group images according to the phases of each sub-pixel. For example, a first phase group image is an image that is represented by pixel data of the first sub-pixel group including sub-pixels B1, G1, G3, and R1, and a second phase group image may be an image that is represented by pixel data of the second sub-pixel group including sub-pixels B2, G2, G4, and R2. As described above, the sub-pixels included in one phase group image may have the same phase as each other.

In addition, the image data provided by the image sensor may be processed by an image processing device in various manners, and an interpolation process may be performed with respect to the image data (e.g., raw data) from the image sensor to convert the image data into RGB image data such that each pixel has data corresponding to respective color components. Before the interpolation process is performed, each sub-pixel has only color information according to a color component corresponding thereto, but after the interpolation process is performed, each sub-pixel may have information about other color components. For example, if a blue color value is interpolated at a location of the first green sub-pixel G1, a blue color value at the location of the first green sub-pixel G1 may be generated by using values of other peripheral pixels (or peripheral sub-pixels) adjacent to the first green sub-pixel G1 in a horizontal and/or a vertical direction.

According to an exemplary embodiment, the interpolation process may be performed with respect to the pixel array structure including the sub-pixels to reduce distortion of image quality while reducing loss in resolution. For example, the image data includes a plurality of pixels, the plurality of pixels may be divided into at least two regions, and then, the interpolation may be performed by performing demosaicing processes of different types with respect to each of the regions of the plurality of pixels. When the pixels of the image data are divided into two regions, the region division operation may be performed in a unit of the sub-pixel. Accordingly, one sub-pixel may be included in one region from among the plurality of regions. Hereinafter, it will be assumed that the region division operation is performed in a unit of the sub-pixel.

Also, when dividing the plurality of sub-pixels included in the image data into at least two regions, the plurality of sub-pixels may be divided as an in-focusing region and an out-focusing region. Accordingly, it is determined whether each of the sub-pixels is included in the in-focusing region or the out-focusing region, and the demosaicing process that is performed with respect to each of the sub-pixels may vary depending on a result of the determination.

In addition, when applying the demosaicing processes of different types, a plurality of demosaicing algorithms that are different from one another may be set in the image processing system, and different demosaicing algorithms may be applied to one sub-pixel according to a result of the determination whether each of the sub-pixels is included in the in-focusing region or the out-focusing region. For example, when an interpolation process is performed with respect to a first sub-pixel and the first sub-pixel is included in the in-focusing region, the demosaicing process may be performed by using a demosaicing algorithm using one or more peripheral sub-pixels having the same phase as that of the first sub-pixel and one or more peripheral sub-pixels having different phase from that of the first sub-pixel, from among the plurality of peripheral sub-pixels adjacent to the first sub-pixel.

On the other hand, when the first sub-pixel is included in the out-focusing region, the demosaicing process may be performed by using a demosaicing algorithm using one or more peripheral sub-pixels having the same phase, from among the plurality of peripheral sub-pixels adjacent to the first sub-pixel. For example, one or more peripheral sub-pixels having the same phase as that of the first sub-pixel may be used. Otherwise, one or more peripheral sub-pixels having the same phase, which is different from that of the first sub-pixel, may be used from among the plurality of sub-pixels adjacent to the first sub-pixel.

In addition, according to an exemplary embodiment, the plurality of sub-pixels having a plurality of phases may be classified as reference phase sub-pixels having a first phase (or reference phase) and non-reference phase sub-pixels having phases different from the first phase. When the first sub-pixel is included in the in-focusing region, the demosaicing algorithm may be performed with respect to the first sub-pixel by using both the non-reference phase sub-pixels having different phases from the reference phase and the reference phase sub-pixels.

However, when the first sub-pixel is included in the out-focusing region, the demosaicing algorithm may be executed with respect to the first sub-pixel by selectively using only the reference phase sub-pixels.

According to the above-described embodiment, an image may be restored with a resolution that is approximate to a resolution of the image sensor with respect to a region that is focused (i.e., the in-focusing region) in a captured image, and thus, the resolution may be improved. Also, with respect to a region that is out-of-focus (i.e., the out-focusing region), the interpolation is performed by using only the sub-pixels having the same phases (or the reference phase), and thus, image distortion or noise may be reduced.

Figure 2:
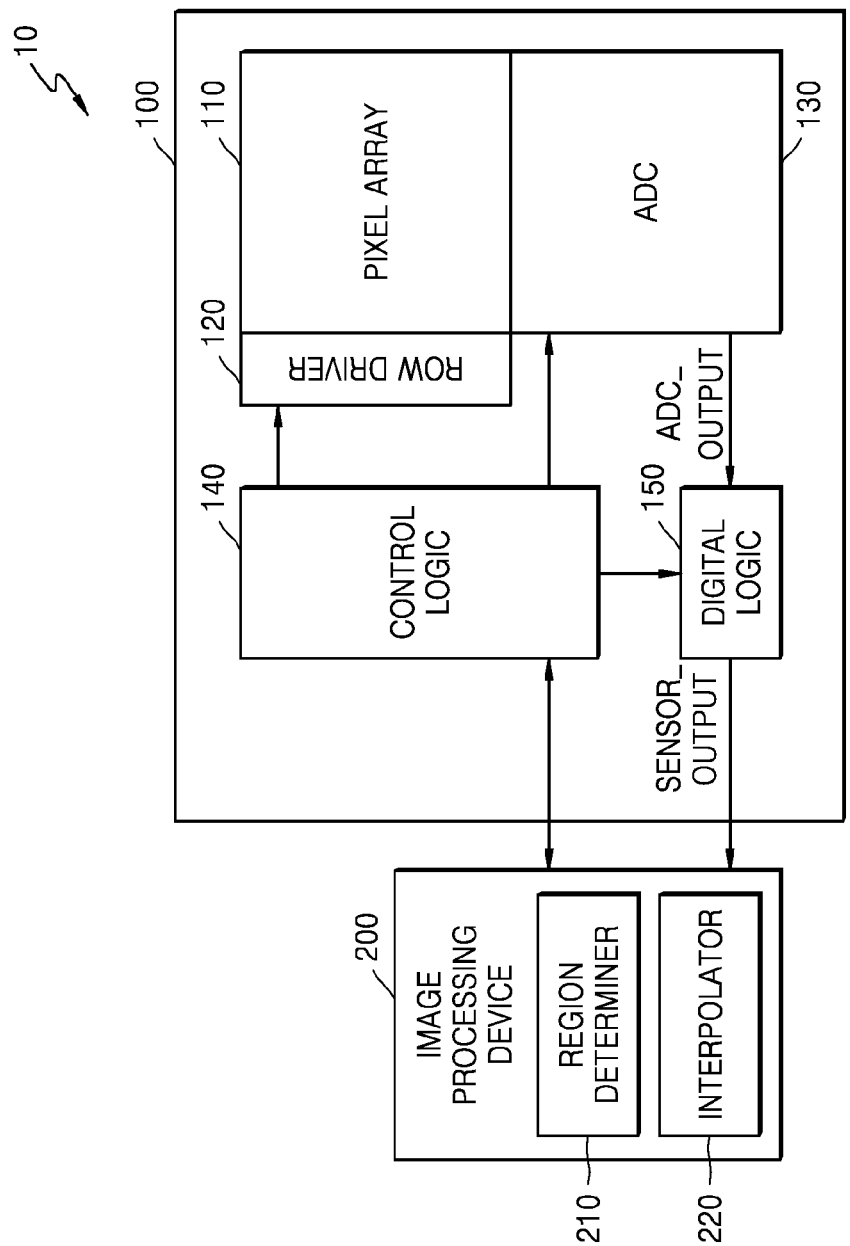
FIG. 2 is a block diagram of an image processing system including an image processing device according to an exemplary embodiment.

FIG. 2 is a block diagram of an image processing system including an image processing device according to an exemplary embodiment.

As shown in FIG. 2, an image processing system 10 may include an image sensor 100 and an image processing device 200. The image processing device 200 may be referred to as an image signal processor (ISP). The image processing device 200 may control an image pickup operation of the image sensor 100, and may receive a sensor output SENSOR_OUTPUT (e.g., image data) obtained through a sensing operation of the image sensor 100. The image processing device 200 may generate an image signal by receiving the image data and performing various processing operations with respect to the image data. For example, the image processing device 200 may determine a region to which each of the pixels (or sub-pixels) belongs, and may perform an interpolation process based on the determination result, according to an exemplary embodiment. In FIG. 2, the image processing device 200 is positioned outside the image sensor 100, but is not limited thereto. That is, the image processing device 200 may be positioned within the image sensor 100.

The image sensor 100 may include a pixel array 110, a row driver 120, an analog-to-digital converter (ADC) 130, a control logic 140, and a digital logic 150. The control logic 140 may control operations of the row driver 120 and the analog-to-digital converter 130. Electric pixel signals generated by the pixel array 110 may be provided to the image processing device 200 as the image data via the analog-to-digital converter 130 and the digital logic 150. As described above, the pixel array 110 may include a plurality of pixels, each of which may include a plurality of sub-pixels. Also, the image data provided to the image processing device 200 may correspond to a plurality of phase group images, according to phase differences between the sub-pixels.

The row driver 120 may drive the pixel array 110 in a row unit, and a row selected in the pixel array 110 may provide a pixel signal to the analog-to-digital converter 130. A digital signal ADC_OUTPUT that is output from the analog-to-digital converter 130 is provided to the digital logic 150, and the image processing device 200 may receive the image data from the digital logic 150 based on the digital signal.

According to an exemplary embodiment, the image processing device 200 receives the image data from the image sensor 100, divides the sub-pixels included in the image data to at least two regions (e.g., the in-focusing region and the out-focusing region) by analyzing the image data, and performs the interpolation process with respect to the sub-pixels in each of the at least two regions by applying different demosaicing algorithms according to which of the at least two regions the sub-pixels are included in. To this end, the image processing device 200 may include a region determiner 210 and an interpolator 220. The region determiner 210 analyzes the image data to divide the plurality of sub-pixels included in the image data as the in-focusing region and the out-focusing region, and generates information representing a result of the division (e.g., an indicator or a flag) to output the information. Also, the interpolator 220 may interpolate color components with respect to each of the plurality of sub-pixels included in the image data. For example, the interpolator 220 may perform the interpolation process by applying different demosaicing algorithms to the sub-pixels with reference to the information such as the indicator or the flag corresponding to each of the sub-pixels.

Figure 3:
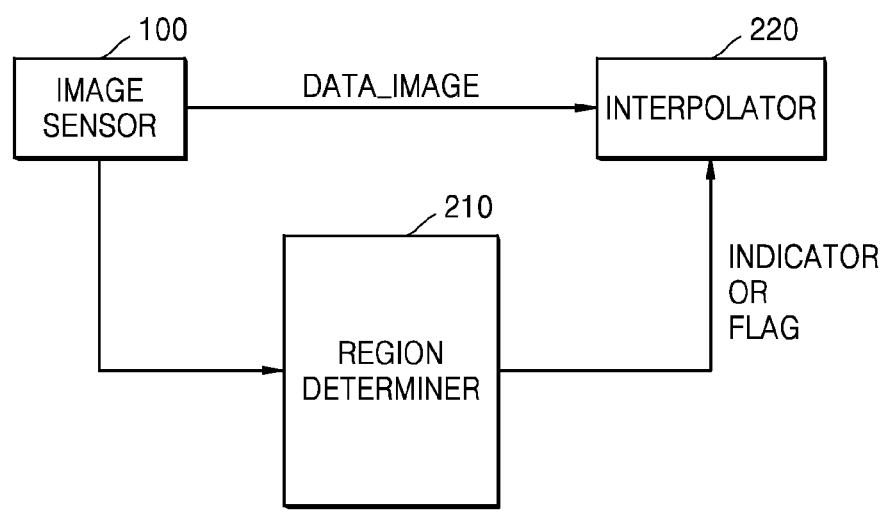
FIG. 3 is a block diagram showing an example of an operation of the image processing device of FIG. 2.

FIG. 3 is a block diagram showing an example of operation of the image processing device 200 of FIG. 2.

As shown in FIG. 3, the image data DATA_IMAGE from the image sensor 100 may be provided to the region determiner 210 and the interpolator 220. The region determiner 210 divides the plurality of sub-pixels included in the image data DATA_IMAGE as the in-focusing region and the out-focusing region, and generates the determination result as an indicator or a flag representing the region to which each of the sub-pixels belongs to provide the determination result to the interpolator 220.

The interpolator 220 may be set to execute a plurality of demosaicing algorithms. The interpolator 220 performs the interpolation process with respect to each of the sub-pixels configuring the image data DATA_IMAGE, and may execute the demosaicing algorithm by using data of peripheral sub-pixels when performing the interpolation process with respect to each of the sub-pixels.

The interpolator 220 may select a demosaicing algorithm to be applied to each of the sub-pixels according to the determination result of the region determiner 210. For example, in case of performing the interpolation process with respect to one sub-pixel (or a first sub-pixel), when an indicator or a flag corresponding to the first sub-pixel has a value of a first state that represents that the first sub-pixel is included in the in-focusing region, a demosaicing algorithm of a first type may be applied to the first sub-pixel to perform the interpolation process. As an example, according to the demosaicing algorithm of the first type, the interpolation process may be performed with respect to the first sub-pixel by using data of one or more peripheral sub-pixels having phases that are the same as that of the first sub-pixel and data of one or more peripheral sub-pixels having phases that are different from that of the first sub-pixel. That is, when the first sub-pixel is included in a first phase group image from among a plurality of phase group images, the demosaicing algorithm using both the peripheral sub-pixels included in the first phase group image and the peripheral sub-pixels included in other phase group images may be executed with respect to the first sub-pixel included in the in-focusing region.

On the other hand, if the indicator or the flag corresponding to the first sub-pixel has a value of a second state that represents that the first sub-pixel is included in the out-focusing region, a demosaicing algorithm of a second type may be applied to the first sub-pixel to perform the interpolation process. As an example, according to the demosaicing algorithm of the second type, the interpolation process may be performed with respect to the first sub-pixel by using only data of one or more peripheral sub-pixels having the same phase. The phases of the peripheral sub-pixels used in the demosaicing are the same, and the phases of the peripheral sub-pixels may be same as or different from the phase of the first sub-pixel. That is, with respect to the first sub-pixel included in the out-focusing region, the demosaicing algorithm using only the peripheral sub-pixels included in one phase group image (e.g., a reference phase group image including sub-pixels having a reference phase) may be executed.

Figure 4:
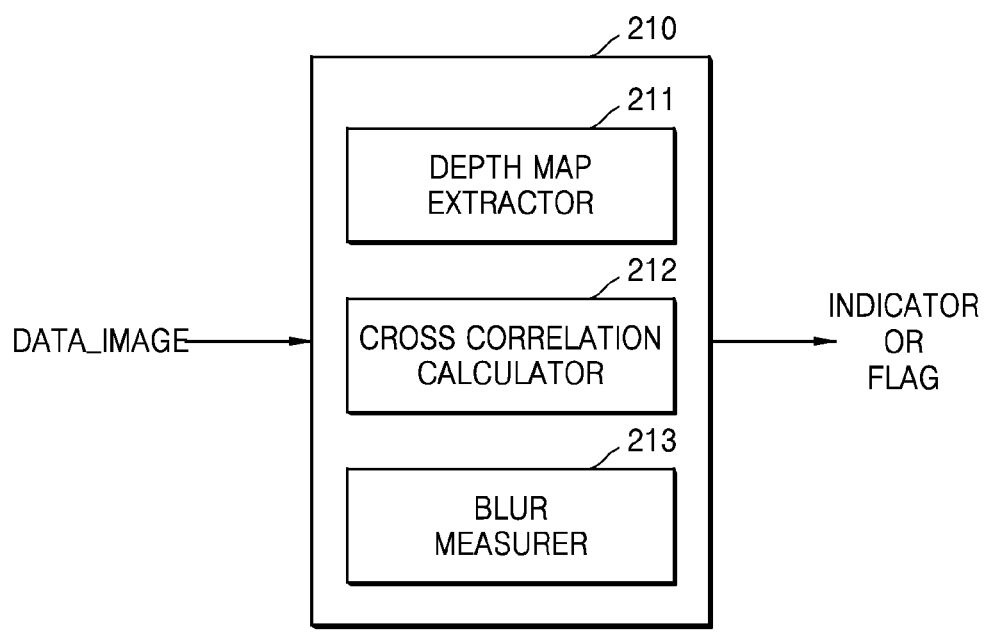
FIG. 4 is a block diagram of a region determiner of FIG. 2.

FIG. 4 is a block diagram of the region determiner 210 of FIG. 2. As shown in FIG. 4, the region determiner 210 may include various functional blocks performing various analysis operations of the image data, For example, the region determiner 210 may include a depth map extractor 211, a cross correlation calculator 212, and a blur measurer 213. The example of the region determiner 210 shown in FIG. 4 is only an example, and the region determiner 210 may include one or more of the plurality of functional blocks shown in FIG. 4. Also, the region determiner 210 may include other functional blocks for performing, for example, a function of classifying the sub-pixels as the in-focusing region and the out-focusing region, according to an exemplary embodiment.

Since the image data DATA_IMAGE is transmitted from the image sensor including the sub-pixels, the image data DATA_IMAGE includes data of a plurality of sub-pixel groups, and the sub-pixels of the image data DATA_IMAGE may be classified as the in-focusing region and the out-focusing region by analyzing similarities between the sub-pixel groups (or phase group images of the sub-pixel groups). The similarity analysis may be performed in various ways, for example, by using a method of extracting a depth map analyzed from a stereo image, a method of extracting a cross correlation between phase difference pixels, and a method of measuring a blur of the image.

An indicator or a flag of each of the sub-pixels may be generated according to an analysis result of at least one from among the depth map extractor 211, the cross correlation calculator 212, and the blur measurer 213. For example, according to a result of analyzing the similarities between the sub-pixel groups (or the phase group images of the sub-pixel groups), a region having similar images and a region having non-similar images may be determined from among the sub-pixel groups having phase differences from each other. The sub-pixels included in the region having the similar images may be determined as the sub-pixels included in the in-focusing region, and the sub-pixels included in the region having non-similar images may be determined as the sub-pixels included in the out-focusing region.

Figure 5:
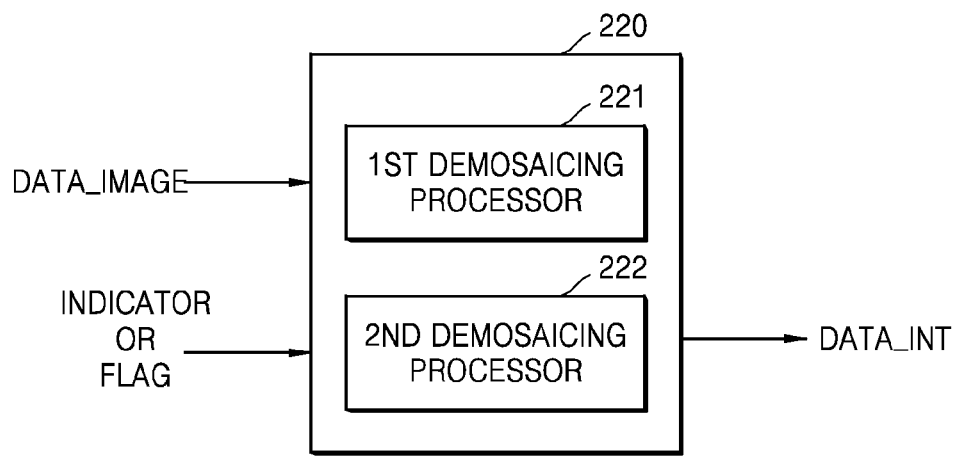
FIG. 5 is a block diagram of an interpolator of FIG. 2.

FIG. 5 is a block diagram of the interpolator 220 of FIG. 2. As shown in FIG. 5, the interpolator 220 may include a plurality of functional blocks for performing the demosaicing according to different algorithms. For example, the interpolator 220 may include a first demosaicing processor 221 for performing the demosaicing according to a first algorithm, and a second demosaicing processor 222 for performing the demosaicing according to a second algorithm.

The interpolator 220 may receive the image data DATA_IMAGE and may perform the interpolation processes with respect to the sub-pixels included in the image data DATA_IMAGE. Also, the interpolator 220 receives the indicator or the flag corresponding to each of the sub-pixels, and may perform the demosaicing of each of the sub-pixels by using the first algorithm or the second algorithm according to the state of the indicator or the flag. The interpolator 220 may generate and output interpolated image data DATA_INT according to a result of the interpolation process.

Figure 6:
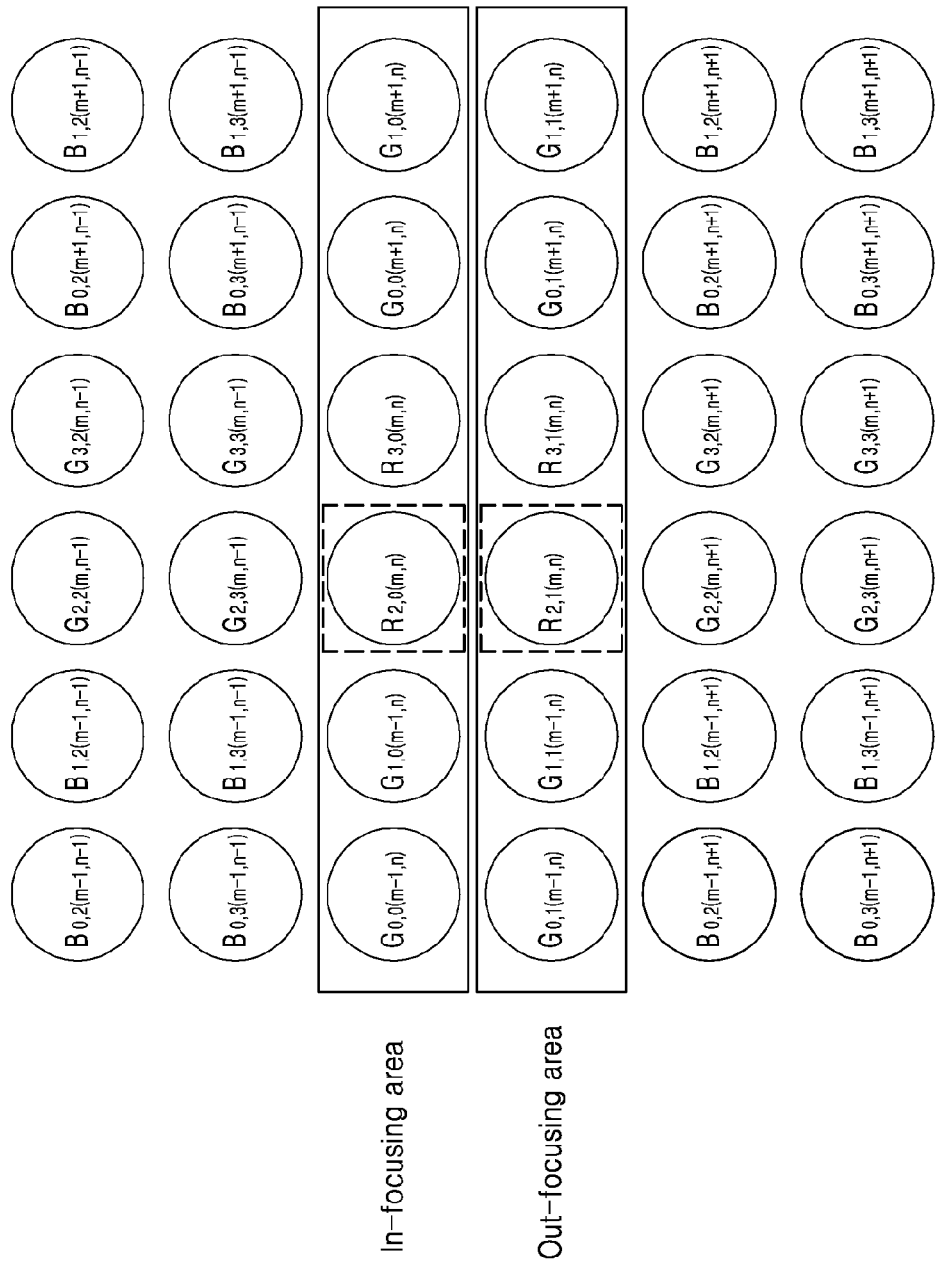
FIG. 6 is a diagram showing an example of performing an interpolation process with respect to one sub-pixel in a pixel array including a plurality of sub-pixels according to an exemplary embodiment.

Detailed operations of the interpolator 220 of FIG. 5 will be described below with reference to FIG. 6. FIG. 6 is a diagram showing an example of performing an interpolation process with respect to one sub-pixel in the pixel array including the plurality of sub-pixels. Also, FIG. 6 shows an example, in which one pixel has 2×2 sub-pixels (top-left, top-right, bottom-left, bottom-right) having different phases. Accordingly, the sub-pixels located at the same locations in the pixels have the same phases. For example, the sub-pixels G0,0(m−1,n), R2,0(m,n), B0,2(m−1,n+1), G2,2(m,n+1) that are located at a top-left position in the plurality of pixels may have the same phase. Also, one of the four sub-pixels (top-left, top-right, bottom-left, and bottom-right) may be defined as a reference phase sub-pixel. For example, it will be assumed that the sub-pixel at the top-left position is defined as the reference phase sub-pixel.

In FIG. 6, it is assumed that the sub-pixels arranged in a certain row are determined as the in-focusing region and the sub-pixels arranged in another row are determined as the out-focusing region. Also, an index value representing one sub-pixel may include an index value indicating a location of the sub-pixel in one pixel group (e.g., a group including 2×2 pixels), and an index value indicating a location of the pixel in the pixel array. For example, in a sub-pixel Gp,q (m,n), p and q may be index values of the sub-pixel in the pixel group having 2×2 pixels. In addition, since each pixel includes 2×2 sub-pixels, the value of (p,q) may have information indicating a 4×4 matrix (i.e., (0,0) to (3,3)). In addition, (m,n) may represent an index value of the pixel in the pixel array, and accordingly, the plurality of sub-pixels included in one pixel may have the same (m,n) value.

In addition, according to the pixel array structure of FIG. 6, the image data may be divided into four phase group images (i.e., first to fourth phase group images). Referring to the pixel groups shown in FIG. 6, the sub-pixels having values of p,q of (0,0), (2,0), (0,2), and (2,2) may be included in the same phase group image (e.g., the first phase group image). Also, the sub-pixels having p,q values of (1,0), (3,0), (1,2), and (3,2) may be included in the second phase group image, the sub-pixels having p,q values of (0,1), (2,1), (0,3), and (2,3) may be included in the third phase group image, and the sub-pixels having the p,q values of (1,1), (3,1), (1,3), and (3,3) may be included in the fourth phase group image.

One of the first to fourth phase group images (e.g., the first phase group image) may be defined as a reference phase group image, and the in-focusing region and the out-focusing region may be classified according to a result of analyzing the similarities between the second to fourth phase group images and the reference phase group image.

In FIG. 6, an example of interpolating a green color value in a horizontal direction at a location of a sub-pixel R2,0 (m,n) and an example of interpolating a green color in a horizontal direction at a location of a sub-pixel R2,1(m,n)

will be described as follows. In FIG. 6, the interpolation process in the horizontal direction is shown as an example, but interpolation operations may be further performed in a vertical direction and/or a diagonal direction according to an exemplary embodiment. In addition, the example that will be described below may be applied to an interpolation operation in any other directions.

The sub-pixel R2,0(m,n) is included in the in-focusing region, and a demosaicing algorithm expressed by Equation 1 may be performed with respect to the sub-pixel R2,0(m,n) to interpolate a green color component G2,0(m,n) according to an exemplary embodiment.

$$G_{2,0(m,n)} = k_{inf(0)} \cdot G_{0,0(m-1,n)} + k_{inf(1)} \cdot G_{1,0(m-1,n)} + k_{inf(2)} \\ *G_{0,0(m+1,n)} + k_{inf(3)} \cdot G_{1,0(m+1,n)}$$ [Equation 1]

The sub-pixel R2,1(m,n) is included in the out-focusing region, and a demosaicing algorithm expressed by Equation 2 may be performed with respect to the sub-pixel R2,1(m,n) to interpolate a green color component G2,1(m,n) according to an exemplary embodiment.

$$G_{2,1(m,n)} = k_{outf(0)} \cdot G_{0,1(m-1,n)} + k_{outf(1)} \cdot G_{0,1(m+1,n)}$$ [Equation 2]

Coefficients $K_{inf(i)}$ and $K_{outf(j)}$ of the above Equation 1 and Equation 2 denote coefficient values of an interpolation filter, which are multiplied with the sub-pixels (e.g., peripheral sub-pixels) according to the applied algorithms.

As expressed by Equation 1, when performing the interpolation process with respect to the sub-pixel R2,0(m,n) included in the in-focusing region, data of peripheral sub-pixels G0,0(m−1, n) and G0,0(m+1,n) having phases that are the same as that of the sub-pixel (R2,0(m,n)) and data of peripheral sub-pixels G1,0(m−1, n) and G1,0(m+1,n) having phases that are different from that of the sub-pixel R2,0(m,n) may be used. In other words, to interpolate the green color component G2,0(m,n) at the location of the sub-pixel R2,0(m,n), an algorithm using the data of the green sub-pixels G0,0(m−1,n) and G0,0(m+1,n) having the phases that are the same as that of the sub-pixel R2,0(m,n) and the green sub-pixels G1,0(m−1,n) and G1,0(m+1,n) having different phases from that of the sub-pixel R2,0(m,n) may be performed. That is, in the interpolation process with respect to the sub-pixel included in the in-focusing region, the data of the peripheral sub-pixels having the same phase and sub-pixels having different phases are used.

However, as expressed by Equation 2, when interpolating the green color component G2,1(m,n) at a location of the sub-pixel R2,1(m,n) included in the out-focusing region, only data of one or more peripheral sub-pixels G0,1(m−1,n) and G0,1(m+1,n) having the same phase may be selectively used. That is, in the interpolation process with respect to the sub-pixel included in the out-focusing region, the data of the peripheral sub-pixels included in one of the four sub-pixel groups may be selectively used.

In other words, an algorithm expressed by following equations may be performed in the interpolation process with respect to the sub-pixel in the out-focusing region.

$$G_{2,1(m,n)} = k_{outf(0)} \cdot G_{0,0(m-1,n)} + k_{outf(1)} \cdot G_{0,0(m+1,n)} \quad (3)$$

$$G_{2,1(m,n)} = k_{outf(0)} \cdot G_{2,0(m,n)} + k_{outf(1)} \cdot G_{2,2(m,n+1)} \quad (4)$$

According to Equation 3, when interpolating the green color component at the location of the sub-pixel R2,1(m,n) included in the out-focusing region, a demosaicing operation may be performed by selectively using reference phase sub-pixels G0,0(m−1,n) and G0,0(m+1,n) having different phases from that of the sub-pixel R2,1(m,n). In addition, according to Equation 4, when interpolating the green color component at the location of the sub-pixel R2,1(m,n) included in the out-focusing region, the sub-pixels having reference phases may be used. For example, a sub-pixel G2,0(m,n) is sub-pixel data generated by the interpolation process, and the demosaicing algorithm may be executed by using the interpolated sub-pixel data.

The interpolation process using the demosaicing algorithm according to each region may be described as follows. In an example pixel array structure of FIG. 6, image data corresponding to one frame may be divided into four phase group images, and when a sub-pixel included in one of the phase group images is included in the in-focusing region, the demosaicing algorithm using data of peripheral sub-pixels included in the other phase group image may be executed with respect to the above sub-pixel. On the other hand, if a sub-pixel included in one of the phase group images is included in the out-focusing region, a demosaicing algorithm selectively using data of peripheral sub-pixels included in one phase group image (for example, the reference phase group image) may be executed with respect to the above sub-pixel.

In above Equation 1 to Equation 4, a linear interpolation method is exemplarily shown as the demosaicing algorithm for performing the interpolation process, but exemplary embodiments are not limited thereto. For example, the demosaicing may be performed according to various algorithms in addition to the algorithms expressed by Equation 1 to Equation 4. For example, a non-linear interpolation or a combined algorithm of different interpolation methods may be applied. By applying the demosaicing algorithm differently to each of the regions, loss of resolution in the in-focusing region of the image may be reduced, and at the same time, noise or distortion caused by the phase difference in the out-focusing region of the image may be reduced.

Also, according to an exemplary embodiment, the peripheral sub-pixels to be used in the demosaicing algorithm may be variously selected. For example, in the interpolation process with respect to the sub-pixel included in the in-focusing region, the peripheral sub-pixels included in the in-focusing region may be selectively used, or the peripheral sub-pixels included in the in-focusing region and the out-focusing region may be used together. In the interpolation process with respect to the sub-pixel included in the out-focusing region, the peripheral sub-pixels may be selected in a similar manner.

Figure 7:
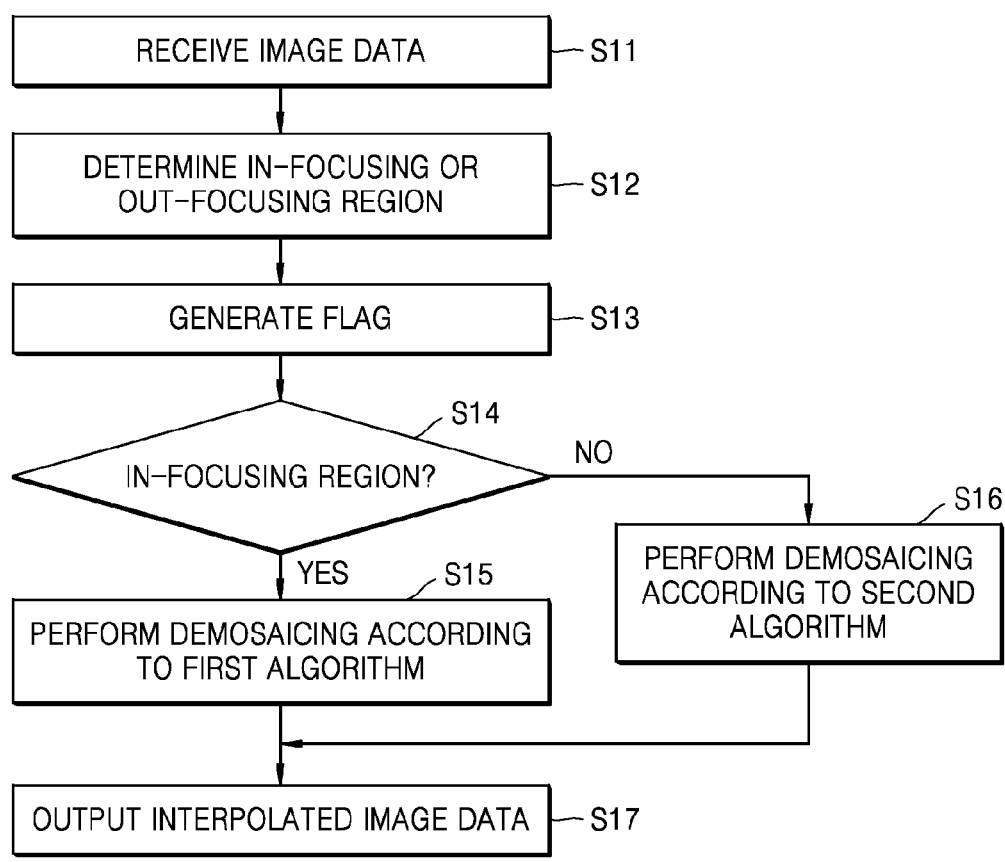
FIG. 7 is a flowchart of an image processing method according to an exemplary embodiment.

FIG. 7 is a flowchart of an image processing method according to an exemplary embodiment.

As shown in FIG. 7, the image processing device receives image data from an image sensor (S11). The image data may include pixel data of a plurality of pixels. Also, since one pixel includes a plurality of sub-pixels, the pixel data may include a plurality of sub-pixel data.

The plurality of sub-pixels included in the image data may be classified as the in-focusing region and the out-focusing region by analyzing the image data. Accordingly, it may be determined whether each of the plurality of sub-pixels is included in the in-focusing region or in the out-focusing region (S12). According to the determination result, a flag (or an indicator) corresponding to each sub-pixel may be generated (S13). For example, if a sub-pixel is included in the in-focusing region, a flag having a first state may be generated, and if the sub-pixel is included in the out-focusing region, a flag having a second state may be generated.

An interpolation process may be performed with respect to each of the sub-pixels, and it may be determined whether a sub-pixel to be interpolated is included in the in-focusing region by detecting a flag corresponding to the sub-pixel to be interpolated (S14). If the sub-pixel is included in the in-focusing region, a demosaicing according to a first algorithm is executed with respect to the sub-pixel (S15). If the sub-pixel is included in the out-focusing region, a demosaicing according to a second algorithm is executed with respect to the sub-pixel (S16). According to the above operation, a plurality of demosaicing algorithms may be applied to one piece of image data to perform the interpolation process, and interpolated image data is generated and output according to the result of the interpolation process (S17).

The first algorithm and the second algorithm of the demosaicing may be variously set according to the above-described embodiments. As an example, in a case of the first algorithm applied to the sub-pixel included in the in-focusing region, the demosaicing may be executed by using data of the peripheral sub-pixels having the same phase as that of the sub-pixel to be interpolated and peripheral sub-pixels having different phases from each other. In a case of the second algorithm applied to the sub-pixel included in the out-focusing region, the demosaicing may be executed by only using the data of the peripheral sub-pixels having the same phases.

Figure 8:
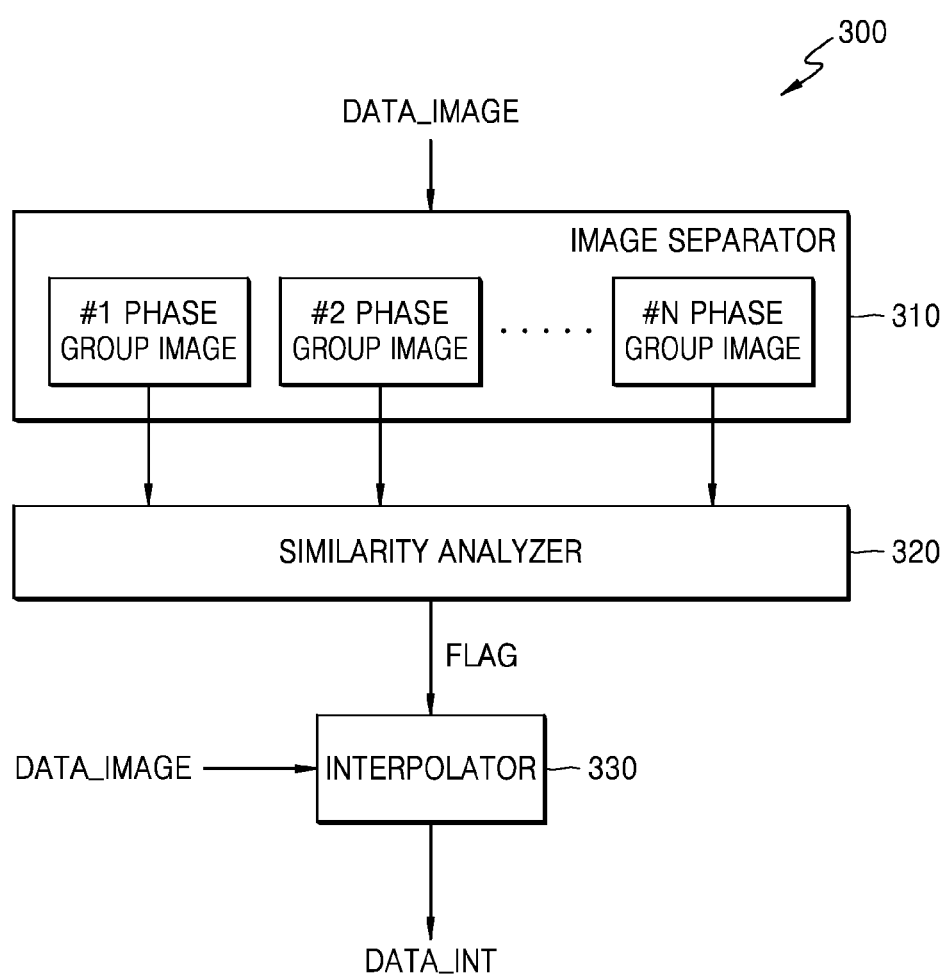
FIG. 8 is a block diagram of an image processing device according to another exemplary embodiment.

FIG. 8 is a block diagram of an image processing device 300 according to another exemplary embodiment. As shown in FIG. 8, the image processing device 300 may include an image separator 310, a similarity analyzer 320, and an interpolator 330.

The image data DATA_IMAGE from the image sensor may be provided to the image separator 310, and the image separator 310 may extract a plurality of phase group images from the image data DATA_IMAGE. If one pixel includes n sub-pixels having different phases from each other, n phase group images may be extracted from the image data DATA_IMAGE. Here, the sub-pixels included in one phase group image may have the same phases.

The similarity analyzer 320 receives the n phase group images and performs a similarity analysis operation of the n phase group images. For example, one of the n phase group images may be set as a reference phase group image, and degrees of similarity between the reference phase group image and the other phase group images may be analyzed to generate an analysis result. The operation of analyzing the similarity may include at least one selected from among the depth map extraction, the cross-correlation calculation, and the blur measuring operation.

Also, the similarity analyzer 320 may generate a plurality pieces of flag information according to the analysis result. For example, the similarity analyzer 320 may generate the flag corresponding to each of the plurality of sub-pixels included in the image data. The interpolator 330 receives the image data DATA_IMAGE, and may control different demosaicing algorithms to be performed with reference to the flag information when performing an interpolation process with respect to the image data DATA_IMAGE. The above-described demosaicing algorithms may be applied to the interpolator 330 of FIG. 8.

Figure 9:
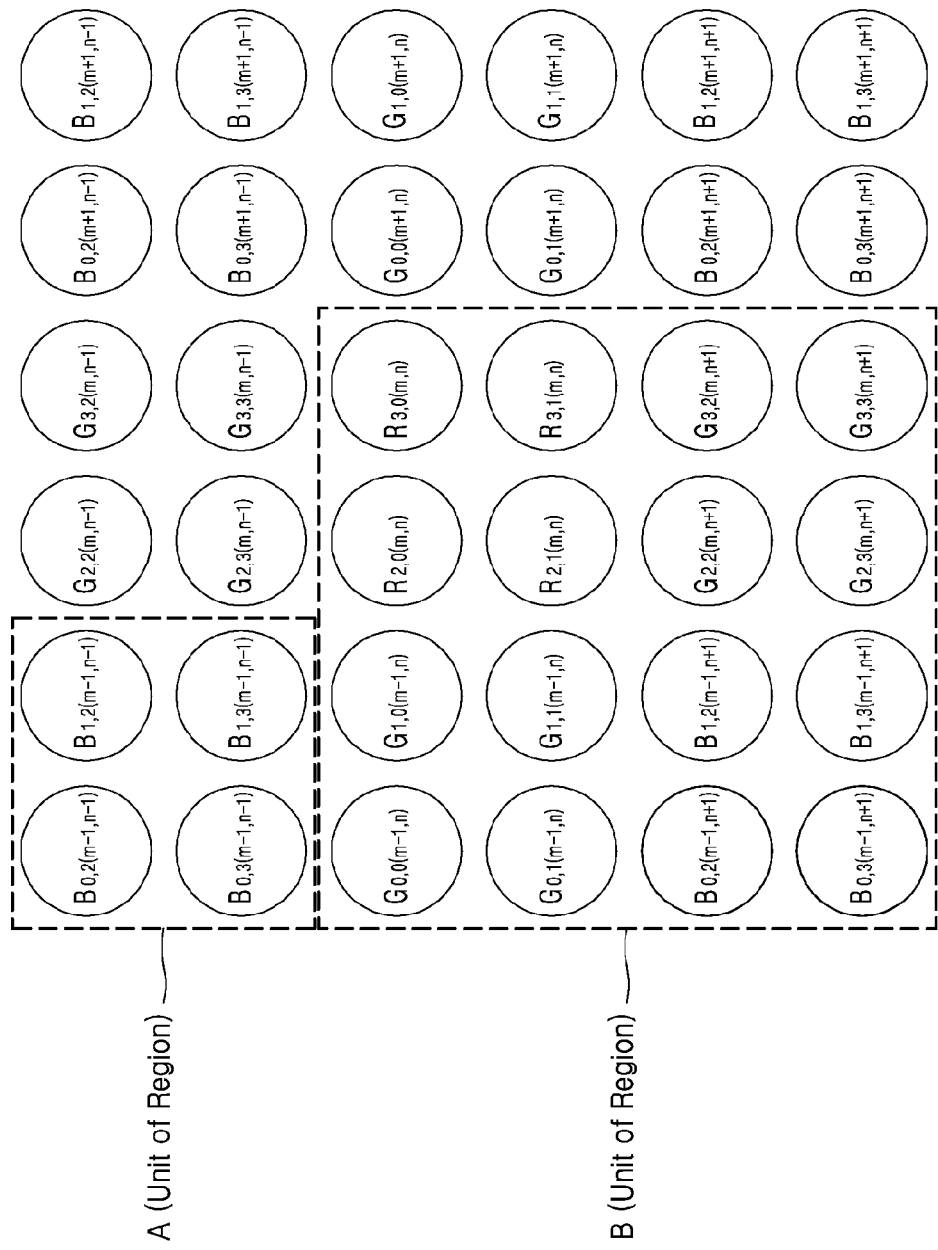
FIG. 9 is a diagram showing various examples of dividing regions according to exemplary embodiments.

FIG. 9 is a diagram showing examples of classifying the regions according to an exemplary embodiment. In FIG. 9, similar to the embodiment of FIG. 6, one pixel includes four sub-pixels (top-left, top-right, bottom-left, and bottom-right) having different phases from each other.

When classifying the pixels (or the sub-pixels) included in the image data as the in-focusing region or the out-focusing region, units configuring each of the regions may be variously set. For example, in FIG. 9, a unit A may be a pixel including four sub-pixels, and thus, the unit configuring one region may be set as a pixel unit A. Accordingly, the four sub-pixels included in one pixel unit A may be included in the same region.

Alternatively, a unit B may be a pixel group including 2×2 pixels, and the unit configuring one region may be set as the pixel group unit B. Accordingly, sixteen sub-pixels included in one pixel group unit B may be included in the same region.

According to the above exemplary embodiment, the region classification may be performed by analyzing data of only some of the sub-pixels included in each unit A or B. For example, if it is determined that the region is configured by the pixel unit A, data of only one sub-pixel (e.g., a reference sub-pixel located at the top-left position) included in the pixel unit A may be analyzed to determine the region where the pixel unit A is included. Also, if it is determined that the region is configured by the pixel group unit B, data of some sub-pixels included in the pixel group unit B may be analyzed to determine the region where the pixel group unit B is included. For example, the data of the reference sub-pixels $G0,0(m-1,n)$, $R2,0(m,n)$, $B0,2(m-1,n+1)$, and $G2,2(m+1,n+1)$ located at the top-left positions in the four pixels included in the pixel group unit B may be analyzed to determine the region where the pixel group unit B is included.

Figure 10:
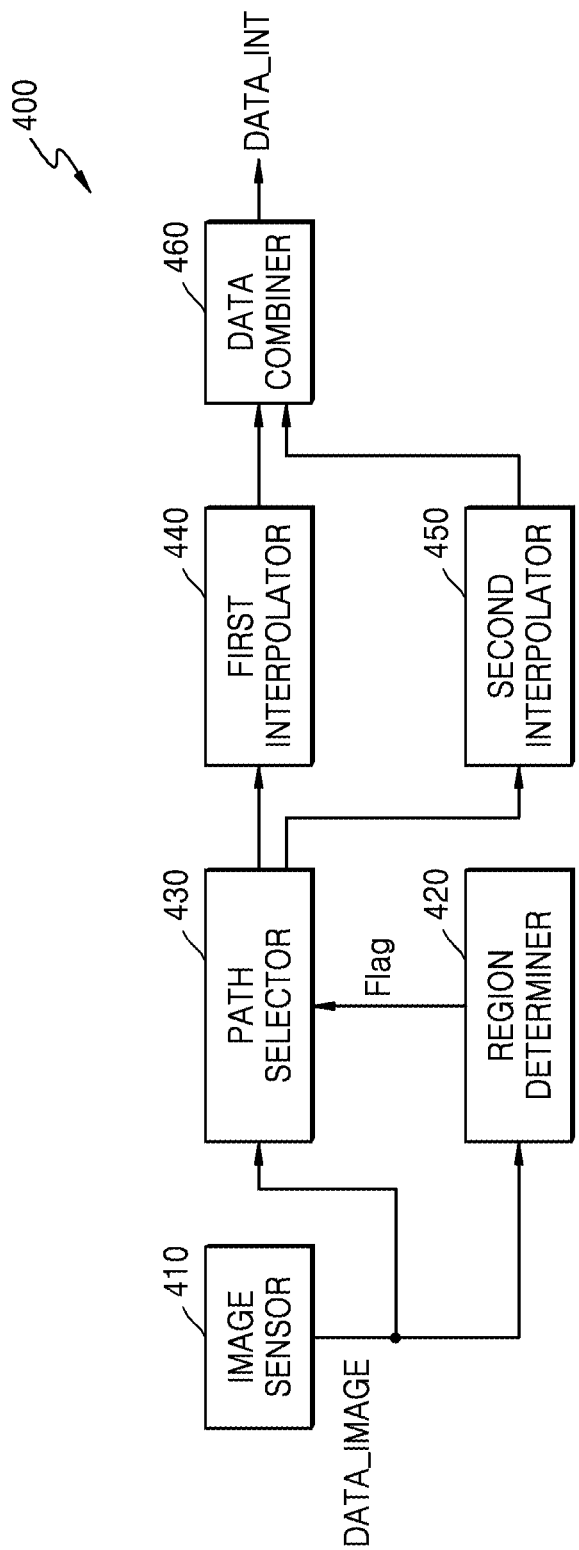
FIG. 10 is a block diagram of an image processing system according to another exemplary embodiment.

FIG. 10 is a block diagram of an image processing system 400 according to another exemplary embodiment. As shown in FIG. 10, the image processing system 400 includes an image sensor 410, a region determiner 420, a path selector 430, a first interpolator 440, and a second interpolator 450, and a data combiner 460.

According to the embodiment of FIG. 10, functional blocks for performing different demosaicing algorithms (e.g., the first interpolator 440 and the second interpolator 450) are separately provided. In addition, the interpolation may be performed by changing the path through which the sub-pixel (or the pixel) is transferred according to the result of determining the region where each of the sub-pixels (or pixels) is included.

The image data DATA_IMAGE from the image sensor 410 may be provided to the region determiner 420 and the path selector 430. The region determiner 420 analyzes the image data DATA_IMAGE as described above with reference to the exemplary embodiments, and generates flag information corresponding to each of the sub-pixels according to the analysis result to provide the flag information to the path selector 430.

The path selector 430 receives the image data DATA_IMAGE including a plurality of sub-pixel data, and may select the transmission path of the data according to the sub-pixel unit. For example, the path selector 430 receives first sub-pixel data, and then, may receive first flag information Flag corresponding to the first sub-pixel data. When the first flag information Flag has a first state, the path selector 430 may provide the first sub-pixel data determined as being included in the in-focusing region to the first interpolator 440. Also, the path selector 430 may receive second sub-pixel data and second flag information Flag corresponding to the second sub-pixel data. When the second flag information Flag has a second state, the path selector 430 may provide the second sub-pixel data determined as being included in the out-focusing region to the second interpolator 450.

The first interpolator 440 and the second interpolator 450 may execute demosaicing algorithms that are different from each other as described above. For example, the first interpolator 440 may perform the interpolation process with respect to the sub-pixels included in the in-focusing region.

In addition, the second interpolator 450 may perform the interpolation process with respect to the sub-pixels included in the out-focusing region.

Figure 11:
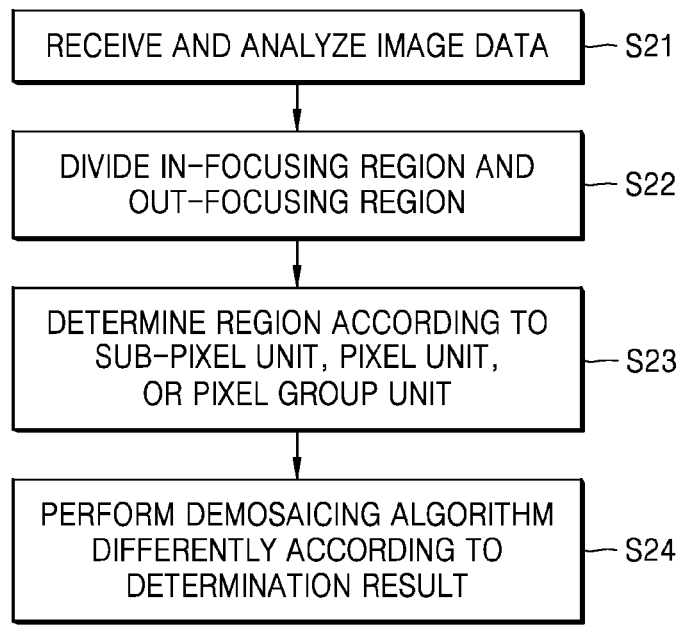
FIG. 11 is a flowchart of an image processing method according to another exemplary embodiment.

FIG. 11 is a flowchart of an image processing method according to another exemplary embodiment.

As shown in FIG. 11, the image processing device receives the image data from the image sensor and analyzes the image data (S21). The image data may include a plurality of sub-pixel data, and the plurality of sub-pixels may be classified as the in-focusing region and the out-focusing region according to the analysis result (S22).

Units for configuring the in-focusing region and the out-focusing region may be variously set, and accordingly, the region determination operation may be performed for each sub-pixel unit, a pixel unit, or a pixel group unit (S23). For example, when each of the sub-pixels is set as the unit configuring the region, the region where each of the sub-pixels is included may be determined. Alternatively, when one pixel including m sub-pixels is set as a unit configuring the regions, the region where the m sub-pixels included in one pixel are included may be determined. Alternatively, when one pixel group including n pixels is set as a unit configuring the regions, the region where the n pixels (or m×n sub-pixels) included in one pixel group are included may be determined.

According to the result of determining the regions, various demosaicing algorithms described above with reference to the exemplary embodiments may be executed (S24). The same type of demosaicing algorithm may be applied to the sub-pixels included in the unit configuring the regions.

Figure 12:
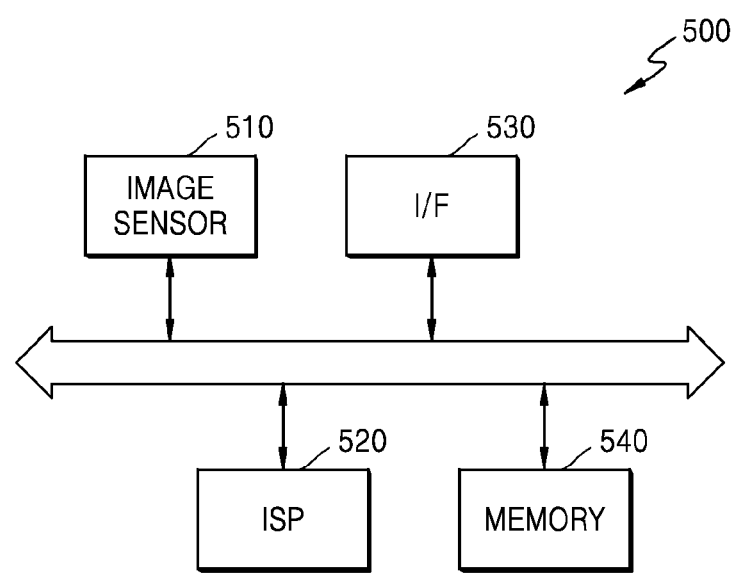
FIG. 12 is a block diagram of a system including an image processing device according to an exemplary embodiment.

FIG. 12 is a block diagram of a system 500 including an image processing device according to an exemplary embodiment.

Referring to FIG. 12, the system 500 may include a digital camera, a mobile phone in which a digital camera is included, or any kind of electronic devices including a digital camera.

The system 500 may process two-dimensional (2D) image information or three-dimensional (3D) image information and may include the image processing device according to an exemplary embodiment as an image signal processor (ISP) 520.

The system 500 may include an image sensor 510, the ISP 520, an interface (I/F) 530, and a memory 540. The I/F 530 is a device for providing a user with an interface, and may be an image display device or an input/output device. The memory 540 may store still images or moving images captured by the image sensor 510 according to a control of the ISP 520. The memory 540 may be a non-volatile memory device.

According to an exemplary embodiment, the ISP 520 may classify the sub-pixels included in the image data provided from the image sensor 510 into a plurality of regions, and may perform an interpolation process by executing demosaicing algorithms differently from the region where each of the sub-pixels is included. Although not shown in FIG. 12, the system 500 may further include a digital signal processor (DSP), and the ISP 520 may be included in the DSP.

Figure 13:
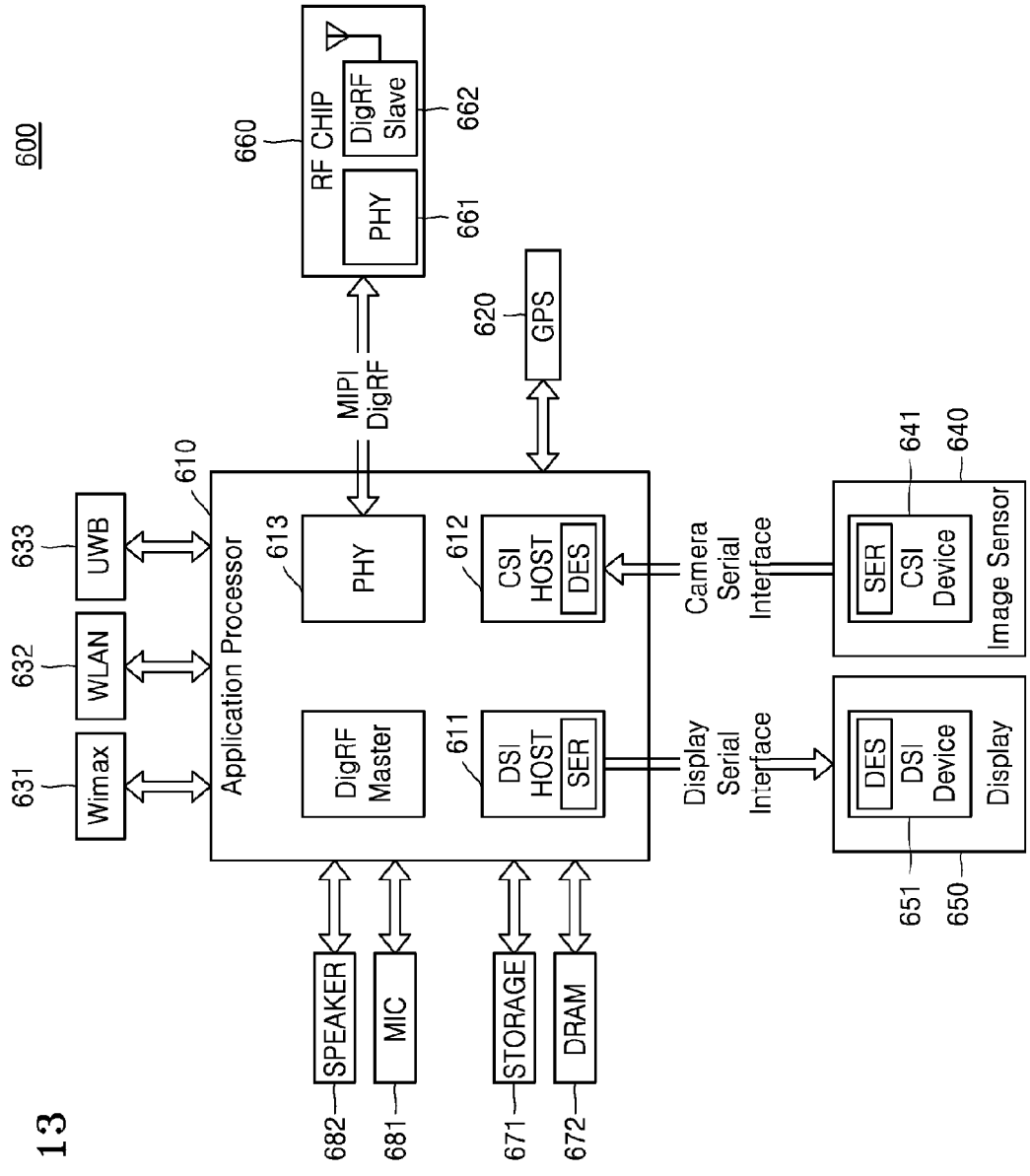
FIG. 13 is a block diagram of an electronic system including an image processing system according to an exemplary embodiment.

FIG. 13 is a block diagram of an electronic system 600 including an image processing system according to an exemplary embodiment. Referring to FIG. 13, the electronic system 600 may be implemented as a data processing apparatus using or supporting an MIPI interface, for example, a mobile phone, a personal digital assistant (PDA), a personal multimedia player (PMP), or a smartphone. The electronic system 600 may include an application processor 610, a CMOS image sensor 640, and a display 650. Also, the CMOS image sensor 640 may include the image processing device (not shown) according to the exemplary embodiments. As described above, the image processing device classifies the sub-pixels included in the image data provided from the image sensor as a plurality of regions, and performs the interpolation process by executing demosaicing algorithms differently according to the region where each of the sub-pixels is included. In addition, the image processing device according to the exemplary embodiments may be provided in the application processor 610.

A camera serial interface (CSI) host 612 included in the application processor 610 may establish serial communication with a CSI device 641 of the CMOS image sensor 640 via a CSI interface. Here, the CSI host 612 may include an optical deserializer and the CSI device 641 may include an optical serializer.

A display serial interface (DSI) host 611 included in the application processor 610 may establish serial communication with a DSI device 651 of the display 650 via a DSI. For example, the DSI host 611 may include an optical serializer, and the DSI device may include an optical DSI deserializer.

The electronic system 600 may further include a radio frequency (RF) chip 660 that may communicate with the application processor 610. A physical layer (PHY) 613 of the electronic system 600 and a PHY 661 of the RF chip 660 may exchange data with each other according to a MIPI DigRF.

The electronic system 600 may further include a global positioning system (GPS) 620, a storage 671, a microphone 681, a dynamic random access memory (DRAM) 672, and a speaker 682. In addition, the electronic system 600 may perform communication by using a Wimax 631, a wireless local area network (WLAN) 632, and an ultra wideband (UWB) 633.

In addition, other exemplary embodiments can also be implemented through computer-readable code/instructions in/on a medium, e.g., a computer-readable medium, to control at least one processing element to implement any above described exemplary embodiment. The medium can correspond to any medium/media permitting the storage and/or transmission of the computer-readable code. The computer-readable code can be recorded/transferred on a medium in a variety of ways, with examples of the medium including recording media, such as magnetic storage media (e.g., read only memories (ROMs), floppy disks, hard disks, etc.) and optical recording media (e.g., compact disk (CD)-ROMs, or digital versatile disks (DVDs)). Examples of programming commands may include high-level codes executable by a computer by using an interpreter, as well as machine codes generated by a compiler. A hardware device may be configured to operate as one or more software modules for performing operations according to the inventive concept, and vice versa.

At least one of the components, elements or units represented by a block as illustrated in FIGS. 2-5, 8, 10, 12, and 13 may be embodied as various numbers of hardware, software and/or firmware structures that execute respective functions described above, according to an exemplary embodiment. For example, at least one of these components, elements or units may use a direct circuit structure, such as a memory, processing, logic, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions. Also, at least one of these components, elements or units may further include a processor such as a central processing unit (CPU) that performs the respective functions, a microprocessor, or the like. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. An image processing apparatus comprising:
    a region determiner configured to receive image data and perform a region determination by determining whether each of a plurality of sub-pixels included in the image data is included in an in-focusing region that is focused or an out-focusing region that is not focused; and
    an interpolator configured to perform demosaicing with respect to a sub-pixel included in the in-focusing region by using a first algorithm and perform the demosaicing with respect to a sub-pixel included in the out-focusing region by using a second algorithm, according to a result of the region determination,
    wherein, when the demosaicing with respect to the sub-pixel included in the in-focusing region is performed, one or more peripheral sub-pixels having phases that are different from a phase of the sub-pixel, on which the demosaicing is performed, are used.

2. The image processing apparatus of claim 1, wherein the region determiner is configured to perform the region determination based on at least one from among a depth map extraction, a cross-correlation calculation, and a blur measurement with respect to the image data.

3. The image processing apparatus of claim 1, wherein the region determiner is configured to output a flag having a state that varies depending on the result of the region determination.

4. The image processing apparatus of claim 3, wherein the interpolator is configured to perform the demosaicing with respect to the sub-pixel by using the first algorithm when the flag corresponding to the sub-pixel has a first state, and perform the demosaicing with respect to the sub-pixel by using the second algorithm when the flag corresponding to the sub-pixel has a second state.

5. The image processing apparatus of claim 1, wherein the image data comprises a plurality of pixels, each of which comprises n (n being an integer equal to or greater than two) sub-pixels having phases different from each other.

6. The image processing apparatus of claim 5, wherein the interpolator is configured to perform the demosaicing with respect to a first sub-pixel included in the in-focusing region by using one or more peripheral sub-pixels having phases that are same as a phase of the first sub-pixel and one or more peripheral sub-pixels having phases that are different from the phase of the first sub-pixel.

7. The image processing apparatus of claim 1, wherein the image data comprises a plurality of pixels, each of which comprises n (n being an integer equal to or greater than two) sub-pixels having phases different from each other, and the interpolator is configured to perform the demosaicing with respect to a first sub-pixel included in the out-focusing region by selectively using one or more peripheral sub-pixels having a certain phase.

8. The image processing apparatus of claim 1, wherein the region determiner is configured to divide the image data into a plurality of phase group images according to phases of sub-pixels included in the image data, and perform the region determination of each sub-pixel by analyzing similarities between a reference phase group image, from among the plurality of phase group images, and a phase group image in which the each sub-pixel is included.

9. The image processing apparatus of claim 1, wherein the image data comprises a plurality of pixels, each of which comprises n (n being an integer equal to or greater than two) sub-pixels having phases different from each other, and the region determiner is configured to perform the region determination according to a unit of a pixel.

10. The image processing apparatus of claim 1, wherein the image data comprises a plurality of pixel groups, each of which comprises a plurality of pixels, and the region determiner is configured to perform the region determination according to a unit of a pixel group.

11. The image processing apparatus of claim 1, wherein the interpolator comprises a first interpolator configured to perform the demosaicing according to the first algorithm and a second interpolator configured to perform the demosaicing according to the second algorithm, and data of each sub-pixel is selectively provided to the first interpolator or the second interpolator according to the result of region determination.

12. An image processing system comprising:
    an image sensor comprising a pixel array, in which a plurality of pixels are arranged, and each of the plurality of pixels comprises n (n being an integer equal to or greater than two) sub-pixels having phases different from each other; and
    an image processing apparatus configured to receive image data from the image sensor, perform a first demosaicing with respect to a first sub-pixel, in response to the first sub-pixel being included in an in-focusing region that is focused, by using peripheral sub-pixels having at least two phases different from each other, and perform a second demosaicing with respect to the first sub-pixel, in response to the first sub-pixel being included in an out-focusing region that is not focused, by using one or more peripheral sub-pixels having the same phase.

13. The image processing system of claim 12, wherein the image processing apparatus comprises:
    a region determiner configured to perform a region determination by determining a region, among the in-focusing region and the out-focusing region, in which the first sub-pixel is included, based on at least one from among a depth map extraction, a cross-correlation calculation, and a blur measurement with respect to the image data; and
    an interpolator configured to perform an interpolation by selectively applying the first demosaicing or the second demosaicing with respect to the first sub-pixel, according to a result of the region determination.

14. The image processing system of claim 12, wherein the region determiner generates a flag corresponding to the first sub-pixel according to a result of the region determination.

15. The image processing system of claim 14, wherein the interpolator is configured to perform an interpolation with respect to the first sub-pixel by performing the first demosaicing according to a first algorithm when the flag has a first value, and perform an interpolation with respect to the first sub-pixel by performing the second demosaicing according to a second algorithm when the flag has a second value.

16. A method of processing an image captured by an image sensor, the method comprising:
 interpolating a first sub-pixel included in the image by performing a first demosaicing algorithm in response to the first sub-pixel being included in a first region in the image, the first region being focused; and
 interpolating a second sub-pixel included in the image by performing a second demosaicing algorithm that is different from the first demosaicing algorithm, in response to the second sub-pixel being included in a second region in the image, the second region being not focused,
 wherein the first demosaicing algorithm uses at least one peripheral sub-pixel having a phase that is different from a phase of a peripheral sub-pixel used in the second demosaicing algorithm.

17. The method of claim 16, wherein the interpolating the first sub-pixel comprises interpolating the first sub-pixel by performing the first demosaicing algorithm using at least two peripheral sub-pixels having phases that are different from each other.

18. The method of claim 16, wherein the interpolating the second sub-pixel comprises interpolating the second sub-pixel by performing the second demosaicing algorithm using one or more peripheral sub-pixels having the same phase.

19. The method of claim 16, further comprising:
 determining the first sub-pixel as being included in the first region or the second sub-pixel as being included in the second region based on at least one from among a depth map extraction, a cross-correlation calculation, and a blur measurement with respect to the image data.

* * * * *